United States Patent [19]
Walker

[11] 4,115,088
[45] Sep. 19, 1978

[54] BINDER APPLICATOR FOR GLASS FIBERS

[75] Inventor: Marvin E. Walker, Lawndale, N.C.

[73] Assignee: PPG Industries, Inc., Pittsburgh, Pa.

[21] Appl. No.: 846,961

[22] Filed: Oct. 31, 1977

[51] Int. Cl.² ............................................. C03B 37/02
[52] U.S. Cl. ................................. 65/11 W; 65/3 R;
65/11 R; 118/63; 118/65
[58] Field of Search .................. 65/3 R, 11 W, 11 R,
65/2; 118/63, 68, 234; 427/350

[56] References Cited
U.S. PATENT DOCUMENTS

| 2,224,149 | 12/1940 | Fisher | 65/3 R X |
| 3,029,161 | 4/1962 | Ferner | 427/350 |
| 3,681,039 | 8/1972 | Marzocchi | 65/3 R |
| 3,920,431 | 11/1975 | Reese | 65/3 R |
| 3,977,854 | 8/1976 | Fulmer et al. | 65/11 W X |
| 4,058,385 | 11/1977 | Kleist | 65/11 W X |

Primary Examiner—Robert L. Lindsay, Jr.
Attorney, Agent, or Firm—Alan T. McDonald; John E. Curley

[57] ABSTRACT

An applicator is disclosed for applying binder and/or size to glass filaments. The applicator is designed to both apply the binder and/or size to the filaments and gather the filaments into a unified strand. Due to its unique design, the applicator directs the moving strand in a direction such that the air flowing downwardly with the filaments as they are formed expels binder and/or size from the filaments and the applicator recovers this material for recirculation. This is accomplished without the need to divert the air flowing downwardly with the filaments from its normal path and without the use of any external deflector shields or other means for diverting airflow.

10 Claims, 8 Drawing Figures

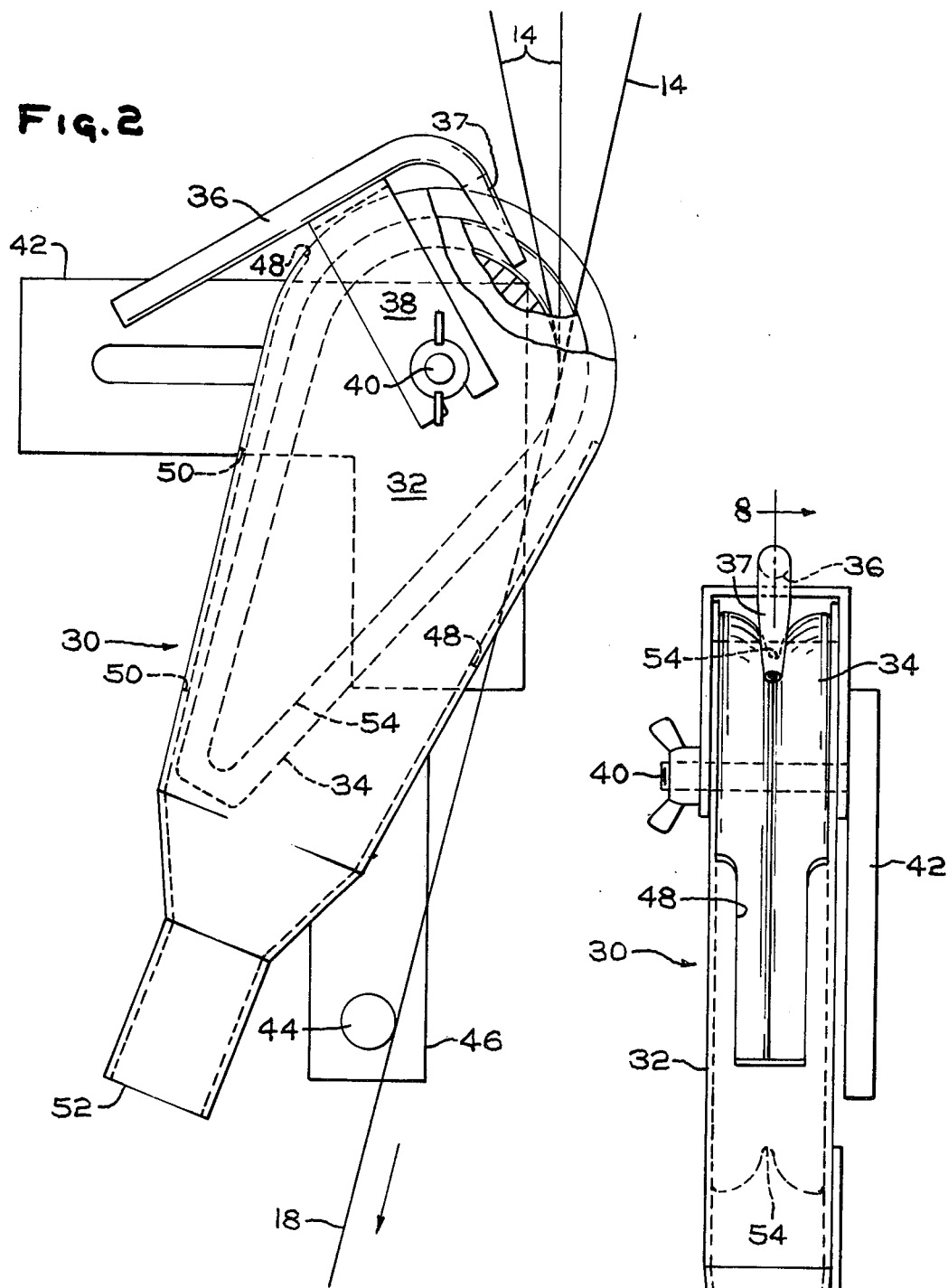

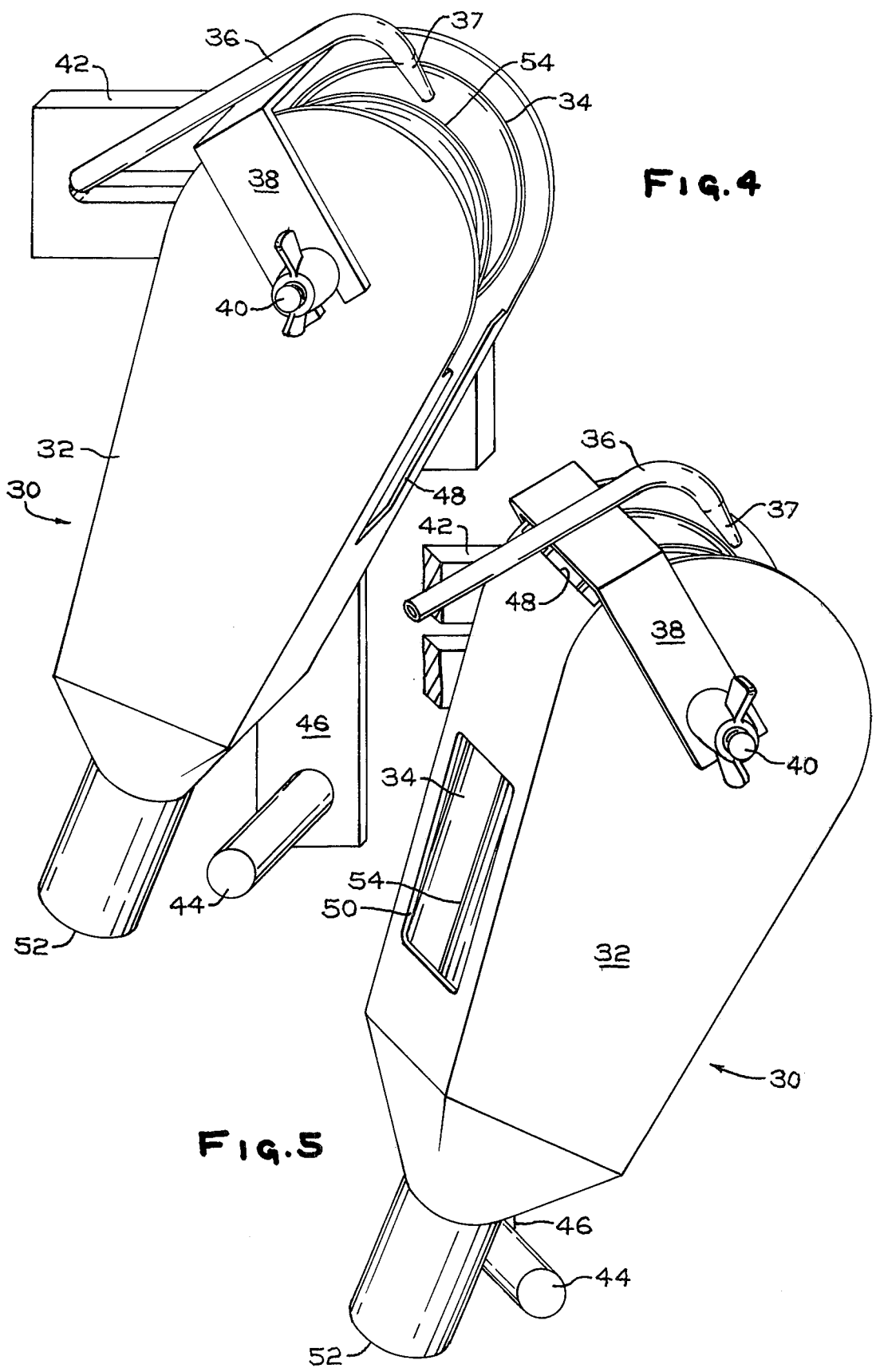

BINDER APPLICATOR FOR GLASS FIBERS

BACKGROUND OF THE INVENTION

Glass fibers are typically formed by attenuating filaments through bushing tips located at the bottom of a heated bushing containing molten glass. The fibers are then passed across an application surface of an applicator where they are coated with a binder and/or size. The filaments are then passed into a gathering means, such as a gathering shoe, which is typically a grooved wheel or cylinder formed of a material such as graphite, with the glass filaments being combined into a unified strand within the groove of the gathering shoe. In some operations, the binder and/or size is applied to the filaments at the gathering means, with these two steps both being performed by a single apparatus, such as a pad applicator.

After the filaments are gathered into a unified strand, the strand is then traversed over a rotating spiral or a reciprocating cam and is collected on a rotating drum or collet as a forming package. In other operations, the strand formed may be chopped into a plurality of particulate strands or passed between belts, wheels or a combination of belts and wheels and attenuated onto a surface as mat or collected in a container. The attenuative forces necessary to form the filaments and strand are produced by either the rotating collet, the chopping apparatus or the attenuator, depending upon the operation being performed.

It is important in the production of glass fibers that a sufficient amount of binder and/or size be applied to the filaments before the filaments come into direct contact with one another. Should the glass filaments come into direct contact with each other without a binder or size present on them the filaments can readily break due to abrasion. Broken filaments can cause a weakened strand to be formed, resulting in fuzz in the strands formed and, if enough filaments are broken, lead to a completely broken strand. In order to reduce or eliminate these occurrences, it is common to apply an excess of binder and/or size to the filaments as they are formed to ensure that every filament is sufficiently coated with a high degree of certainty.

The overcoating of the glass filaments with binder and/or size causes its own problems. During attenuation, this liquid binder and/or size is sometimes thrown from the surfaces of the filaments, which are traveling at a high linear rate of speed, typically on the order of 1,000 to 20,000 feet per minute (324.8 to 6496 meters per minute). This causes housekeeping problems in the fiber forming area.

Another problem associated with the preparation of forming packages or containerized packages of glass strand with excess binder and/or size thereon, is the problem of binder migration. After the forming package or containerized package is produced, it is subjected to a baking operation to remove moisture from the strand. During this process, excess binder and/or size in the forming package or containerized package tends to migrate to the innermost and outermost regions of the package, causing an excess of binder and/or size solids on the strands at the inside and outside of the package. This, of course, results in an inconsistant strand and is thus highly undesirable.

It is desirable, therefore, to produce glass strands which do not have an excess binder and/or size thereon when they are collected but which still have been coated to an extent such that they have sufficient binder and/or size thereon with a high degree of certainty to assure complete coverage of the filaments.

A further problem associated with excess binder and/or size on glass strand is that the excess binder and/or size which is either thrown off in liquid form from the strand as it is being collected or baked from the strand package and migrated to the surfaces of the package is wasted material. This adds significantly to the cost of producing the strand and thus reduces the profitability of the product.

It is also desirable, therefore, to recover any excess binder and/or size which has been applied to the filaments so that this material can be recycled through the application system.

In U.S. Pat. No. 3,029,161 an apparatus is illustrated for recovering excess binder from a pad applicator. This apparatus recovers only the excess binder and/or size dripping from the applicator pad surface. There is no teaching in this patent of removing excess binder from the strand surfaces after the binder and/or size is applied to the filaments and recovering this material.

U.S. Pat. No. 3,977,854 illustrates an apparatus which removes excess binder and/or size from the strand after the filaments have been coated. This apparatus diverts a portion of the air normally flowing downwardly with the filaments across the strand surface. Thus, this patent requires that the normal airflow associated with the filament formation be diverted from its normal downward path. Such diversion in airflow patterns can affect the operation of the forming position, since successful glass fiber formation is highly dependent upon control of the bushing environment and the airflows associated therewith. The apparatus of this patent also requires a deflector shield for accomplishing this result. It is thus an object of the present invention to recover excess binder and/or size from glass strand without the need of diverting air from its normal downward flow pattern with the filaments in a fiber forming operation and without the necessity of auxiliary apparatus for diverting air flowing downwardly with the filaments and strand.

THE PRESENT INVENTION

In accordance with the present invention, an applicator is provided which, due to its unique structure, uses the air flowing downwardly with the filaments as they are formed to remove excess binder and/or size from the strand but does not require the diversion of the air from its normal downward path. The applicator includes a gathering means which in longitudinal section generally resembles an inverted teardrop. This gathering element is located within a housing which also has a generally inverted teardrop shape in longitudinal section. By inverted teardrop is meant a shape defined by an isoscoles triangle standing on its apex and having an arc or semi-circle extending from the base of the triangle and wherein the base of the triangle defines the diameter of the circle or width of the arc. The housing has an opening at its top to allow the filaments to contact the surface of the gathering element and be combined into a unified strand thereon. Means are also provided to direct the strand in such a manner that a portion of the air flowing downwardly with the filaments in its normal downward path will flow across the strand, carrying the excess binder and/or size from the strand into the applicator. The balance of the air flowing downwardly with the filaments also follows its natural path, flowing outside the applicator. Thus, the excess binder and/or size on the strand is removed therefrom by the natural air currents passing downwardly with the filaments, without the necessity of an external means for diverting airflow out of its normal downward path and across the strand.

The gathering surface is supplied with binder and/or size from a supply means. This supply means can be a trickle tube located above the surface of the gathering element which is connected to the supply source of the binder and/or size. Optionally, the gathering element may be supplied with the binder and/or size from internal outlets located within the gathering element and extending to its gathering surface, with these outlets being connected to the supply source of the binder and/or size. The applicator is also supplied with an outlet which is connected to the circulation system for the binder and/or size to thereby recirculate excess binder and/or size collected from the strand.

Unlike the belt and roller applicators typically employed, the applicator of the present invention has no moving parts, thus substantially reducing maintenance time and increasing reliability.

By employing the applicator of the present invention, excess binder and/or size can be removed readily from the surface of the strand as it is continuously formed and recirculated to the binder and/or size supply source. At the same time, airflows in the fiber forming operation are not diverted from their normal downward path. These effects result in the formation of a high quality glass fiber strand at a reduced cost with less wasted binder and/or size.

BRIEF DESCRIPTION OF THE DRAWINGS

The applicator and gathering device of the present invention will be more fully described with reference to the drawings in which:

FIG. 2 is an enlarged front elevational view of the application and gathering portion of the strand formation apparatus illustrated in FIG. 1;

FIG. 3 is a side elevational view of the application and gathering device of the present invention;

FIGS. 4 and 5 are perspective views of the application and gathering device of the present invention;

DETAILED DESCRIPTION OF THE INVENTION

Figure 1:
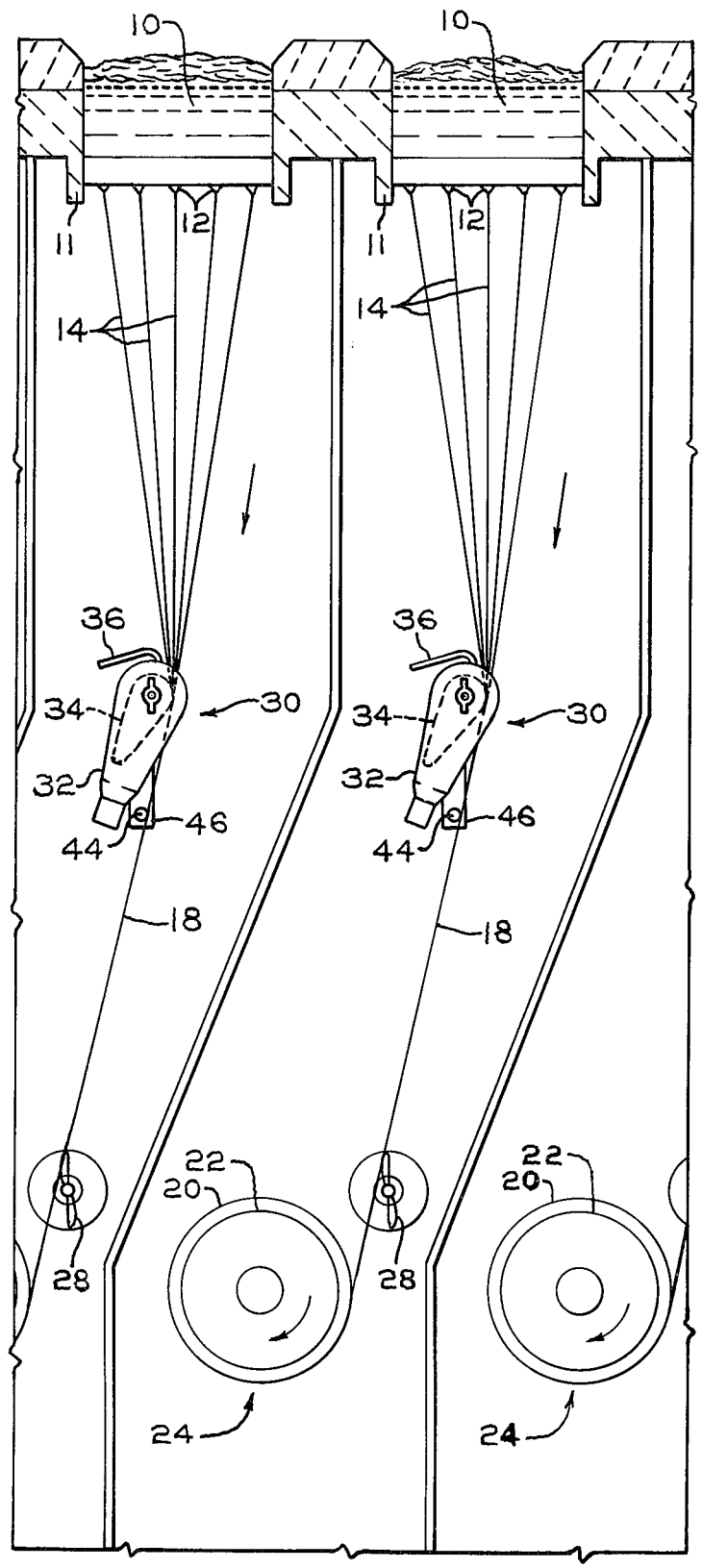
FIG. 1 is a diagrammatic front elevational view of a glass fiber forming operation employing the applicator and gathering device of the present invention.

Turning to FIG. 1, glass filaments 14 are attenuated from molten glass 11 through bushing tips 12 located at the bottom of a heated bushing 10. The filaments 14 are then passed over the applicator and gathering device 30 where the filaments 14 are coated with a binder and/or size and gathered into unified strand 18. The operation of this application and gathering device will be more fully described below.

The strand 18 is then traversed across the face of a rotating spiral 28 and collected as a forming package 20 on a rotating collet 22 carried by a winder 24. Optionally, the filaments 14 and strand 18 could be attenuated by a belt, wheel or combination belt and wheel attenuator into a collector as a containerized package or chopped between a pair of rotating surfaces, one of which having a plurality of blades on the exterior surface thereof, with the chopped strand then being collected in a container.

The operation of the applicator 30 is best seen in FIGS. 2 through 5. Turning to these figures, the filaments 14 are pulled downwardly from the bushing. The filaments 14 enter the applicator 30 through an opening 48 at the top of housing 32. Housing 32 is formed of a material which can withstand the environment of the forming position, such as brass, stainless steel, aluminum or organic resin. The opening 48 is designed to allow the filaments 14 to enter the applicator 30 and contact gathering element 34 in its groove 54. Gathering element 34 is formed of a material which will not be abraded readily by the filaments 14, such as brass or graphite. The applicator 30 is supplied binder and/or size through means such as trickle tube 36 which is connected to a supply source of the binder and/or size (not shown). The trickle tube 36 supplies the binder and/or size to the groove 54 in the gathering element 34. The location of the nozzle 37 of the trickle tube 36 with respect to the groove 54 of the gathering element 34 can be adjusted. Trickle tube 36 is mounted on adjustment bracket 38. The adjustment bracket 38 is connected to the housing 32 of the applicator 30 through bolt 40. Bolt 40 passes through the adjustment bracket 38, through one wall of the housing 32 of the applicator 30, through the gathering element 34, through the other wall of housing 32 and again through adjustment bracket 38. In addition to allowing adjustment for the trickle tube 36, bolt 40 maintains the position of the gathering element 34 within the applicator 30. Also, the bolt 40 attaches adjustment bracket 42 to the applicator 30. Adjustment bracket 42 is used to position the applicator 30 in the glass fiber forming operation. Bracket 42 allows both vertical and horizontal positioning of the applicator 30 and bolt 40 provides rotational positioning of the applicator 30.

As the filaments 14 enter opening 48, they contact the gathering element 34 in the groove 54. They are coated with the binder and/or size in the groove 54 from trickle tube 36 and are gathered into a unified strand 18 within the groove 54. After being formed, the strand 18 passes out of the applicator 30, again through opening 48, and downwardly to be collected. Guide means, such as stud 44, are provided which are connected to the applicator housing 32 by means of adjustable bar 46. This stud 44 helps direct the strand 18 from the applicator 30 so that the strand 18 exits the applicator 30 without contacting applicator housing 32 and in such a manner that the strand passes in a proper position to have its excess binder and/or size removed, as will be more fully explained below. The guide stud 44 is made of a material which will not be abraded readily by the strand 18, such as graphite or brass.

Figure 8:
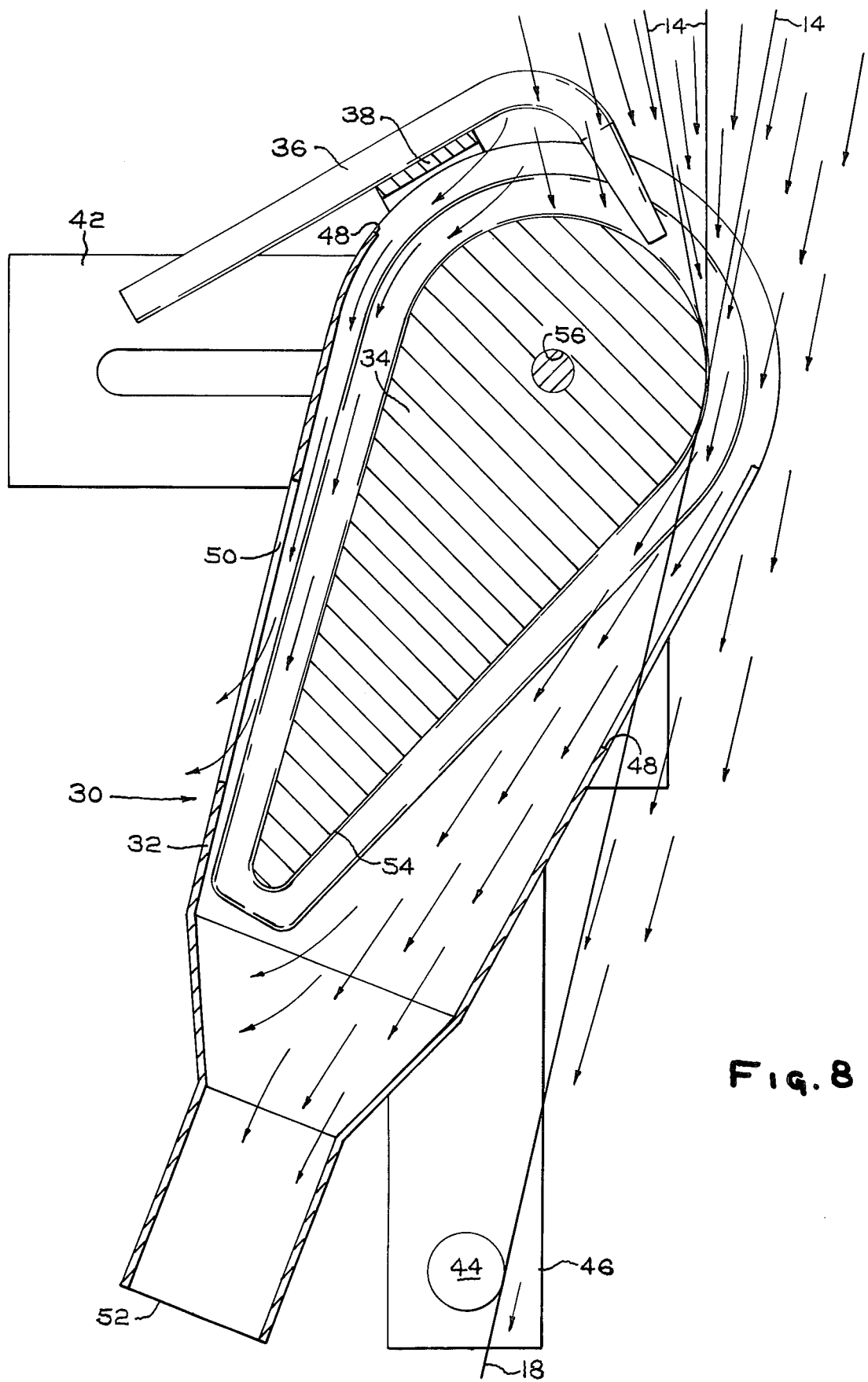
FIG. 8 is a longitudinal view through line 8—8 of FIG. 3, illustrating the airflow pattern associated with the application and gathering device of the present invention.

The airflow pattern associated with the applicator of the present invention is best seen in FIG. 8. As can be seen, the air flows downwardly with the filaments from the bushing. That part of the air which falls outside of the applicator 30 is not diverted from its normal downward path. It flows downwardly towards the collection means unhindered. The portion of the air which normally contact the gathering shoe and flows around the shoe in a typical glass fiber forming operation enters the applicator 30 through the opening 48 at the top thereof and flows along the back of the gathering element 34 to vent 50.

The most important airflow pattern, which is unique to the applicator of the present invention, is the air flowing downwardly with the filament fan 14 and which flows into opening 48 at the top of housing 32 of the applicator 30 to pass downwardly with the strand 18. This air takes its normal pattern downwardly with the strand 18. However, due to the generally inverted teardrop shape of the applicator 30, as previously defined, and the positioning of the strand 18 as it passes from the gathering element 34 to the guide stud 44, the strand 18 passing through the applicator 30 passes across the airflow stream and the air stream removes excess binder from the strand 18 as the strand 18 passes from its gathering point in the groove 54 to its exit from the opening 48. This is accomplished without disrupting the normal downward airflow pattern of the glass fiber forming operation, since the unique shape of the applicator employed in the present invention allows the airflow pattern to retain its normal downward pattern while at the same time directing the strand across this airflow and removing excess binder and/or size from the strand 18.

The positioning of the strand 18 such that a portion of the airflow passing downwardly with the filaments passes into the applicator 30 and removes the excess binder and/or size therefrom while in its normal downward flow pattern is accomplished by horizontal, vertical and rotational placement of the housing 32 and the horizontal and vertical placement of the guide means, such as stud 44. This placement will vary according to the type of strand being produced, since different products will have various airflow patterns associated with their attenuation. Thus, the applicator 30 is adjusted to provide maximum binder and/or size removal, according to the product being produced.

The air entering the applicator 30 is vented through vent 50. At the same time, the excess liquid binder and/or size follows the generally inverted teardrop shape of the gathering element 34 and drops off the bottom of the gathering element 34 and through outlet 52 to be recirculated to the binder and/or size recirculation system. Thus, the applicator of the present invention permits recovery of excess binder and/or size which has been coated onto the filaments 14 without disruption of the downward airflow patterns normally associated with glass fiber formation and without the necessity of a deflector shield to divert air from its normal downward flow pattern.

Figure 6:
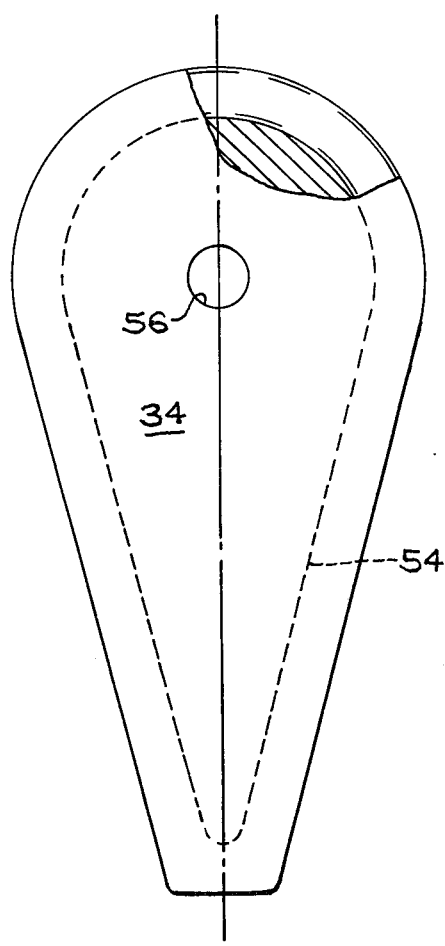
FIG. 6 is a front elevational view of the gathering element which may be employed in the application and gathering device.
Figure 7:
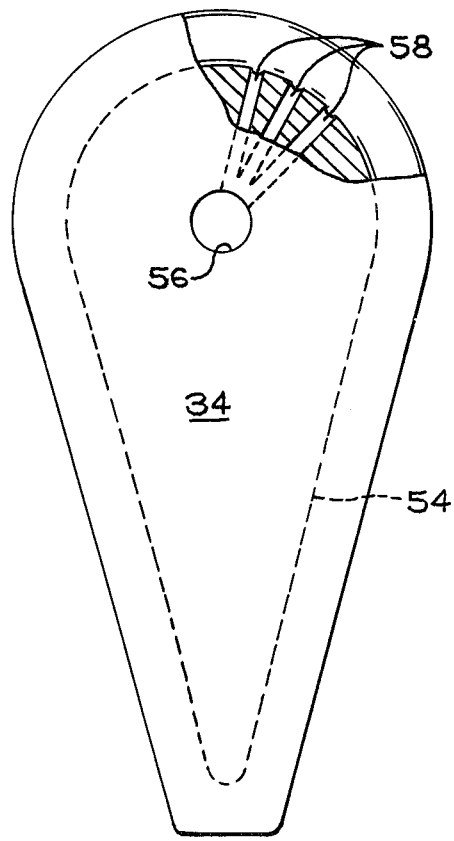
FIG. 7 is a front elevational view of a modified gathering element which may be employed in the application and gathering device of the present invention.

The generally inverted teardrop shape of the gathering element 34 is best seen in FIGS. 6 and 7. In these figures, the gathering element 34 includes grooves 54, which, as previously mentioned, is employed to both gather the filaments 14 into strand 18 and to guide the excess binder to outlet 52. The gathering element 34 includes opening 56 through which bolt 40 passes to maintain the gathering element 34 in position within housing 32. It should be noted that the function of the gathering element 34 can be successfully accomplished with a gathering element which includes only one half of the complete element shown in FIG. 6. That is, element 34 could be sliced through its vertical center line and one half of the element could be employed successfully. Of course, if this is done, opening 56 would be relocated to fall within the remaining element. It is, however, the shape of this half element, in combination with the shape and positioning of the strand 18 into the air stream that accomplishes the desired excess binder and/or size capturing result.

FIG. 7 illustrates an alternative embodiment for the gathering element 34a. In this embodiment, a plurality of fluid outlets 58 are connected to the opening 56. These elements 58 are open to the groove 54 of the gathering element 34a. When a gathering element 34a as shown in FIG. 7 is employed, opening 56 is connected to the supply source of binder and/or size and acts as a common header for the outlets 58. Thus, in this embodiment, the bolt 40 employed to maintain the applicator in position would have a hollow shaft. The bolt would be connected to the supply source of the binder and/or size and connected in fluid flow communication with opening 56. The binder and/or size then exits outlets 58 and is coated onto the filaments 14. In this embodiment, trickle tube 36 and its associated adjustment bracket 38 are eliminated.

It is clear from the foregoing that the present invention provides an applicator which both successfully removes excess binder and/or size from the glass strand as it is formed and which does not effect the downward airflow patterns commonly associated with glass fiber formation.

While the invention has been described with reference to certain specific embodiments thereof it is not intended to be so limited thereby, except as set forth in the accompanying claims.

I claim:

1. An applicator for applying binder and/or size to glass filaments comprising a gathering element to combine said filaments into a strand, means for supplying binder and/or size to said gathering element, a housing containing said gathering element, said housing having an opening through which said strand passes, said opening being arranged to permit downward airflow along the path of said strand, a strand guide means and means for positioning said applicator in a glass fiber forming apparatus, said gathering element and said housing each having a generally inverted teardrop shape in longitudinal section and said positioning means being arranged to guide said strand across a downward airstream associated with formation of said strand to thereby remove excess binder and/or size from said strand with said air stream and recover said excess binder and/or size in said housing without diverting said downward airstream from its normal path.

2. The apparatus of claim 1 wherein said guide means comprises a guide stud.

3. The apparatus of claim 1 wherein said means for supplying binder and/or size comprises a trickle tube.

4. The apparatus of claim 1 wherein said means for supplying binder and/or size comprises a plurality of outlets within the gathering element connected to a common header.

5. The apparatus of claim 1 further comprising means for venting air from said housing.

6. In an apparatus for forming glass fibers comprising a bushing having a plurality of bushing tips through which filaments are attenuated, means for applying a binder and/or size to the filaments, means for gathering the filaments into a unified strand and means for collecting the resulting strand the improvement wherein said means for applying binder and/or size to the filaments and said means for gathering the filaments into a unified strand comprises an applicator comprising a gathering element, means for supplying binder and/or size to said gathering element, a housing containing said gathering element, said housing having an opening through which said strand passes, said opening being arranged to permit downward airflow along the path of said strand, a strand guide means and means for positioning said applicator in said glass fiber forming apparatus, said gathering element and said housing each having a generally inverted teardrop shape in longitudinal section and said positioning means being arranged to guide said strand across a downward airstream associated with formation of said strand to thereby remove excess binder and/or size from said strand with said air stream and recover said excess binder and/or size in said housing without diverting said downward airstream from its normal downward path.

7. The apparatus of claim 6 wherein said guide means comprises a guide stud.

8. The apparatus of claim 6 wherein said means for supplying binder and/or size comprises a trickle tube.

9. The apparatus of claim 6 wherein said means for supplying binder and/or size comprises a plurality of outlets located within the gathering element connected to a common header.

10. The apparatus of claim 6 further comprising means for venting air from said housing.

* * * * *